United States Patent
Wong

(10) Patent No.: US 7,029,585 B1
(45) Date of Patent: Apr. 18, 2006

(54) GREASE TRAP

(76) Inventor: Pik N. Wong, 7709 19th Ave., Brooklyn, NY (US) 11214

( * ) Notice: Subject to any disclaimer, the term of this patent is extended or adjusted under 35 U.S.C. 154(b) by 0 days.

(21) Appl. No.: 10/413,720

(22) Filed: Apr. 15, 2003

(51) Int. Cl.
*B01D 17/025* (2006.01)

(52) U.S. Cl. .................. 210/532.1; 210/538; 210/539

(58) Field of Classification Search ............ 210/532.1, 210/534, 535, 538, 540, 539
See application file for complete search history.

(56) References Cited

U.S. PATENT DOCUMENTS

| | | | | |
|---|---|---|---|---|
| 723,618 | A * | 3/1903 | Newton | 210/538 |
| 1,237,068 | A * | 8/1917 | Loeb | 210/538 |
| 2,081,215 | A * | 5/1937 | Boosey | 210/538 |
| 2,348,167 | A * | 5/1944 | Ransome | 210/538 |
| 2,624,463 | A * | 1/1953 | Freese | 210/532.1 |
| 3,688,904 | A * | 9/1972 | Knepp | 210/534 |
| 4,938,878 | A * | 7/1990 | Hall | 210/540 |
| 5,368,747 | A * | 11/1994 | Rymal et al. | 210/534 |
| 6,123,857 | A * | 9/2000 | Brade | 210/535 |

FOREIGN PATENT DOCUMENTS

| | | | |
|---|---|---|---|
| FR | 374040 | * | 6/1907 |
| GB | 19069 | * | 0/1893 |

* cited by examiner

*Primary Examiner*—Christopher Upton

(57) ABSTRACT

The grease trap is a device that may be attached to the drainpipe of a sink and the outlet pipe of a plumbing system to remove grease from wastewater before it enters the plumbing system. The device uses simple principles of gravity and separation of immiscible liquids to achieve this goal. Also provided with the present invention is a vent pipe to decrease the production of unpleasant odors. A covered opening is provided for removing the grease periodically.

12 Claims, 3 Drawing Sheets

GREASE TRAP

BACKGROUND OF THE INVENTION

1. Field of the Invention

The present invention relates to devices for separating grease from water. In particular, devices of this type are tailored for use with wastewater from commercial and residential sinks.

2. Description of the Prior Art

The presence of grease in wastewater from sinks is a common plumbing problem. When this wastewater passes through pipes the grease will accumulate at joints and partial clogs. The result is that grease in the wastewater will either cause or exacerbate clogs in the pipes. It is therefore desirable to eliminate grease from wastewater before it passes into the plumbing system. This leads to the desirability of a device connected to the outtake of a sink that will allow for the removal of grease from the wastewater before it enters the remaining pipes.

In most residential kitchen designs there is very limited space between the outtake of the sink and the plumbing system. The space in most commercial designs is not much greater. It is therefore desirable that any device designed for the abovementioned purpose is as compact as possible. To this end, the structural elements of such a device should be minimized as much as possible. The present invention comprises a unique structural design that accomplishes this requirement to a greater degree then any of the devices existing in the prior art.

When grease accumulates in an environment of stagnant air, noxious fumes will develop. The devices in the prior art for separating grease from wastewater lead to the capture of grease in such an environment. This leads to very unpleasant odors. The present invention comprises a design feature undisclosed by the prior art that leads to air circulation and release of fumes that will minimize this problem.

U.S. Pat. No. 2,393,498 to Dewey A. Miller is a separator tank designed for removing rubber particles from an effluent. To this end it comprises several features that are not necessary for the simple goal of removing grease and would lead to an unnecessary use of space. Several baffles are incorporated in the Miller '498 design that are not required in the design of the present invention. Furthermore, the orientation of the intake and outtake ports of the present invention differs greatly from the Miller '498 patent. This structural distinction is significant since this particular orientation is crucial to the efficacy of the present invention. There is not air venting system included in the Miller '498 patent.

U.S. Pat. No. 3,527,348 to H. J. Lalonde et al discloses an apparatus for separating immiscible liquids that is primarily designed for industrial purposes and for removing oil spills form seawater. This design requires a relatively high rate of flow of the fluid being separated to be effective. The baffling that is introduced would not be effective for a rate of flow that exists in common sinks. The intake and outtake orientation differs from the present invention. There is no air venting system included in the Lalonde '348 patent.

The device disclosed in U.S. Pat. No. 4,472,277 to Bailey et al is a grease trap that is designed for a similar purpose to the present invention. However this device requires a baffling system to accomplish the same task as the present invention. The crucial distinction in structure between the Bailey '277 patent and the present invention is the orientation of the intake and the outtake of the devices. The unique orientation of the present invention makes the baffling of the Bailey '277 device unnecessary to accomplish the same separation effect. There is no air venting system included in the Bailey '277 patent.

U.S. Pat. No. 5,492,619 to William C. Batten is a grease collecting system. This system employs an automated skimming system. It includes the use of pumps and electronic mechanisms. This will greatly increase the cost and need for maintenance over the present invention. It will also require more space, which will limit the capacity for use in residential sinks. There is no air venting system included in the Batten '619 patent.

U.S. Pat. No. 5,505,860 to Robert J. Sager describes a grease trap that also has an outtake and intake orientation that differs from the present invention. This design requires a cup feature that is necessary to reduce the turbulence of water as it enters the chamber. This feature would not be necessary on the present invention. Also required in the Sager '860 design is a baffling system that is not needed in the present invention to accomplish the same goal. Thus the present invention enables a crucial reduction in space required. There is no air venting system included in the Sager '860 patent.

U.S. Pat. No. 5,993,646 to James S. Powers discloses yet another grease trap that employs an outtake and intake orientation that differs from the present invention. This design requires an additional compartment to reduce the turbulence of water as it enters the separation chamber. This element would not be necessary on the present invention. And, as with the Sager '860 patent, the Powers '646 patent requires a baffling system. The Powers '646 design therefore requires an unnecessary use of space. There is no air venting system included in the Sager '860 patent.

Therefore a need exists for a novel and enhanced method for removing grease from wastewater. This device should be space efficient and durable. It should also be easy to keep clean. In this respect, the grease trap according to the present invention substantially departs from the conventional concepts and designs of the prior art, and in doing so provides an apparatus primarily developed for the purpose of removing grease from wastewater.

SUMMARY OF THE INVENTION

In view of the foregoing disadvantages inherent in the known types of grease traps now present in the prior art, the present invention provides an improved combination of convenience and utility, and overcomes the abovementioned disadvantages and drawbacks of the prior art. As such, the general purpose of the present invention, which will be described subsequently in greater detail, is to provide a new and improved grease trap which has all of the advantages of the prior art mentioned heretofore and many novel features that result in a grease trap which is not anticipated, rendered obvious, suggested, or even implied by the prior art, either alone or in combination thereof.

In furtherance of this objective, the grease trap comprises a container that has an intake port passing into its side at a point above the lower portion of the container. The bottom of the container has an outtake port that is attached to a pipe. The pipe extends to a horizontal section that has a top level that is higher then the top level of the intake port.

There has been outlined, rather broadly, the more important features of the invention in order that the detailed description thereof that follows may be better understood and in order that the present contribution to the art may be better appreciated.

The container of the present invention may in addition comprise a third vent port at a point higher then the intake port.

An additional aspect of the grease trap is an opening in the top of the container. A cover is provided with the present invention that may be secured to cover the opening and may be opened to remove the grease build up at the top of the container.

To facilitate the flow of water into the outtake port, the circumference of the lower portion of the container gradually decreases to the circumference of the outtake port.

To provide a stable installation of the grease trap, the present invention includes a plurality of flanges attached to the top edge of the container. The flanges have holes. The flanges may be placed flush against the back wall below the sink and bolts or screws may be inserted to mount the grease trap to the wall.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved grease trap that has all of the advantages of the prior art and none of the disadvantages.

It is another object of the present invention to provide a new and improved grease trap that may be easily and efficiently manufactured and marketed.

An even further object of the present invention is to provide a new and improved grease trap that has a low cost of manufacture with regard to both materials and labor, and which accordingly is then susceptible of low prices of sale to the consuming public, thereby making such grease trap economically available to the buying public.

Still another object of the present invention is to provide a new replaceable grease trap that provides in the apparatuses and methods of the prior art some of the advantages thereof, while simultaneously overcoming some of the disadvantages normally associated therewith.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
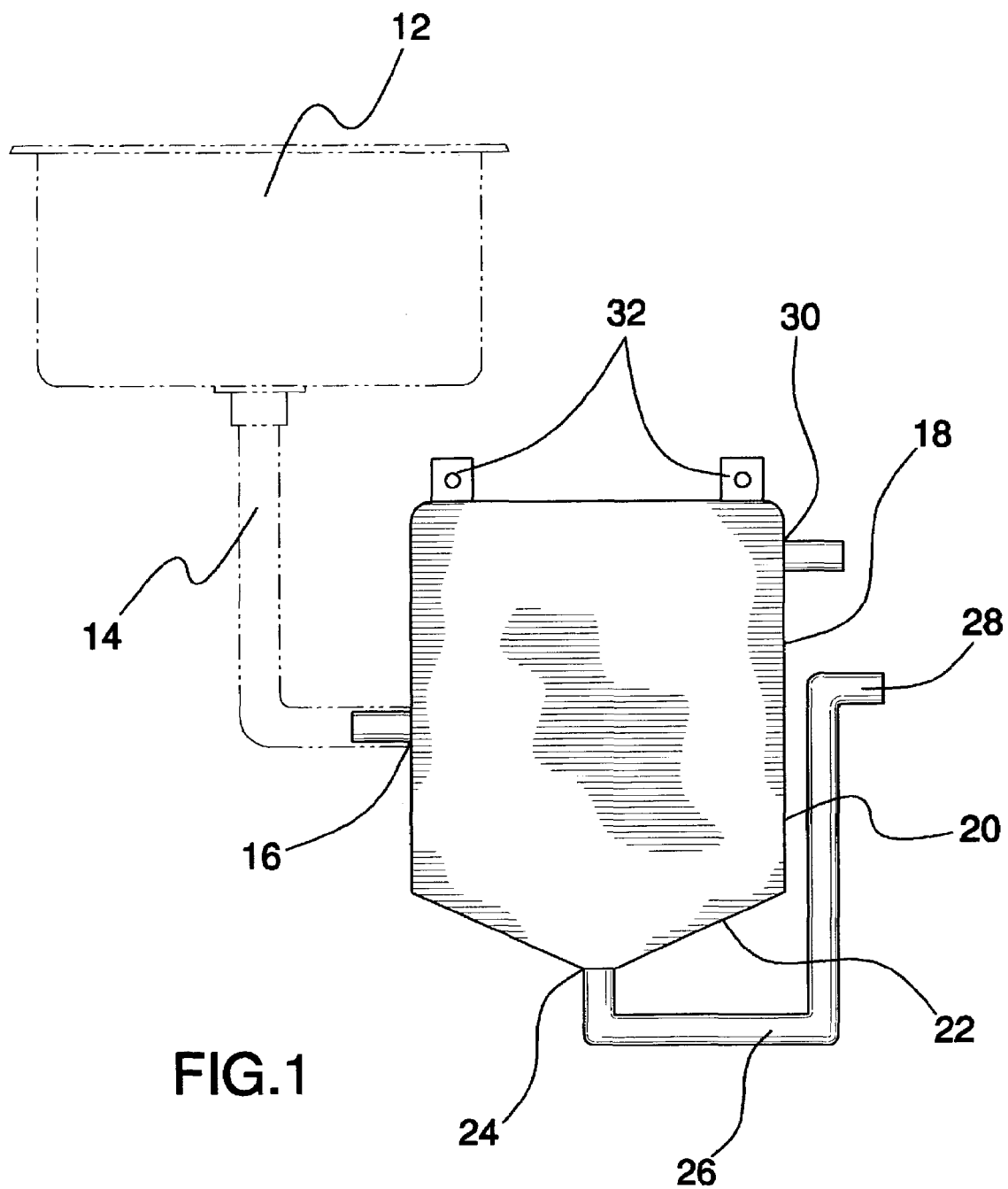
FIG. 1 is a front view of the preferred embodiment of the grease trap of the present invention.
Figure 2:
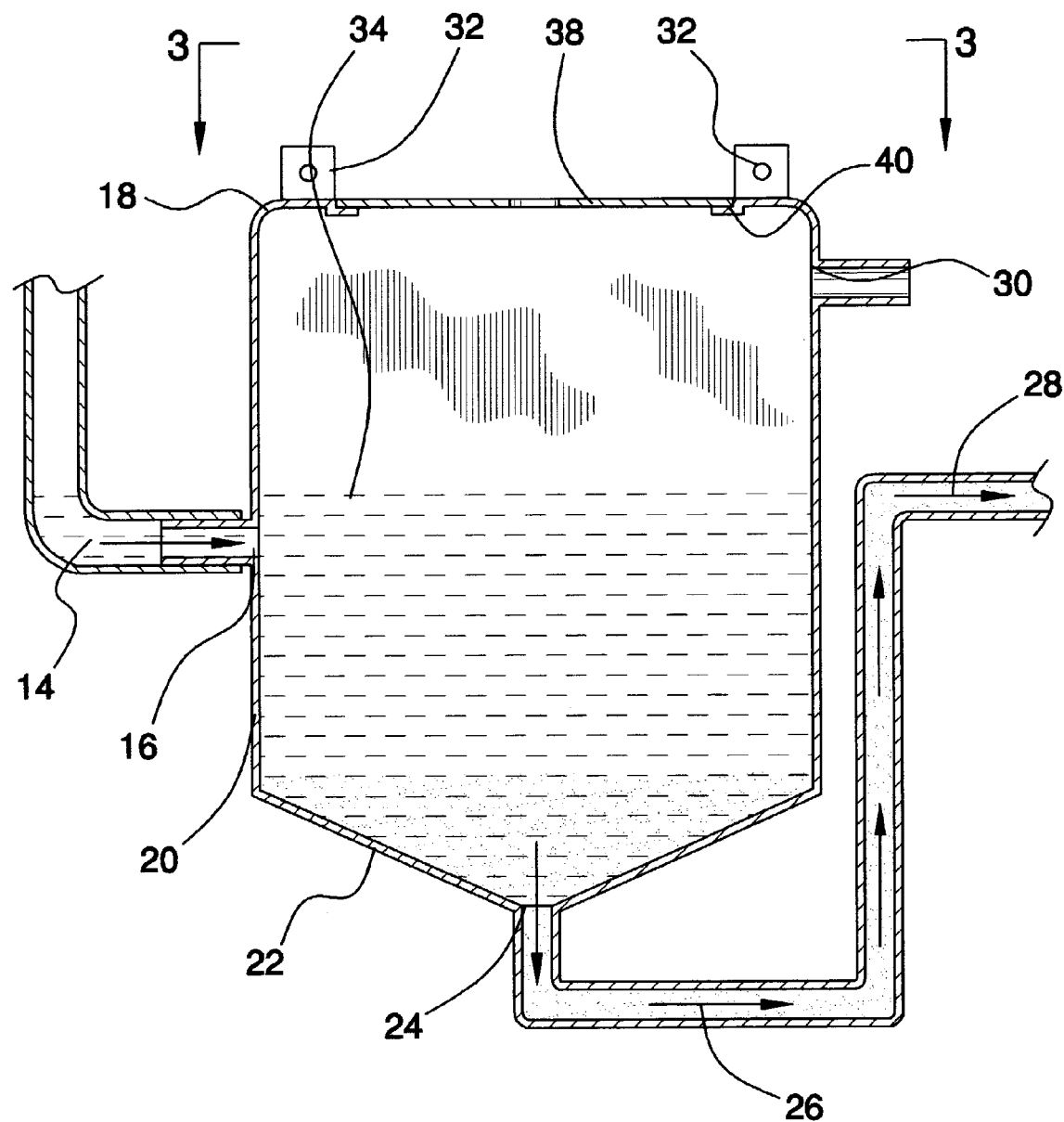
FIG. 2 is a front sectional view of the grease trap of the present invention.
Figure 3:
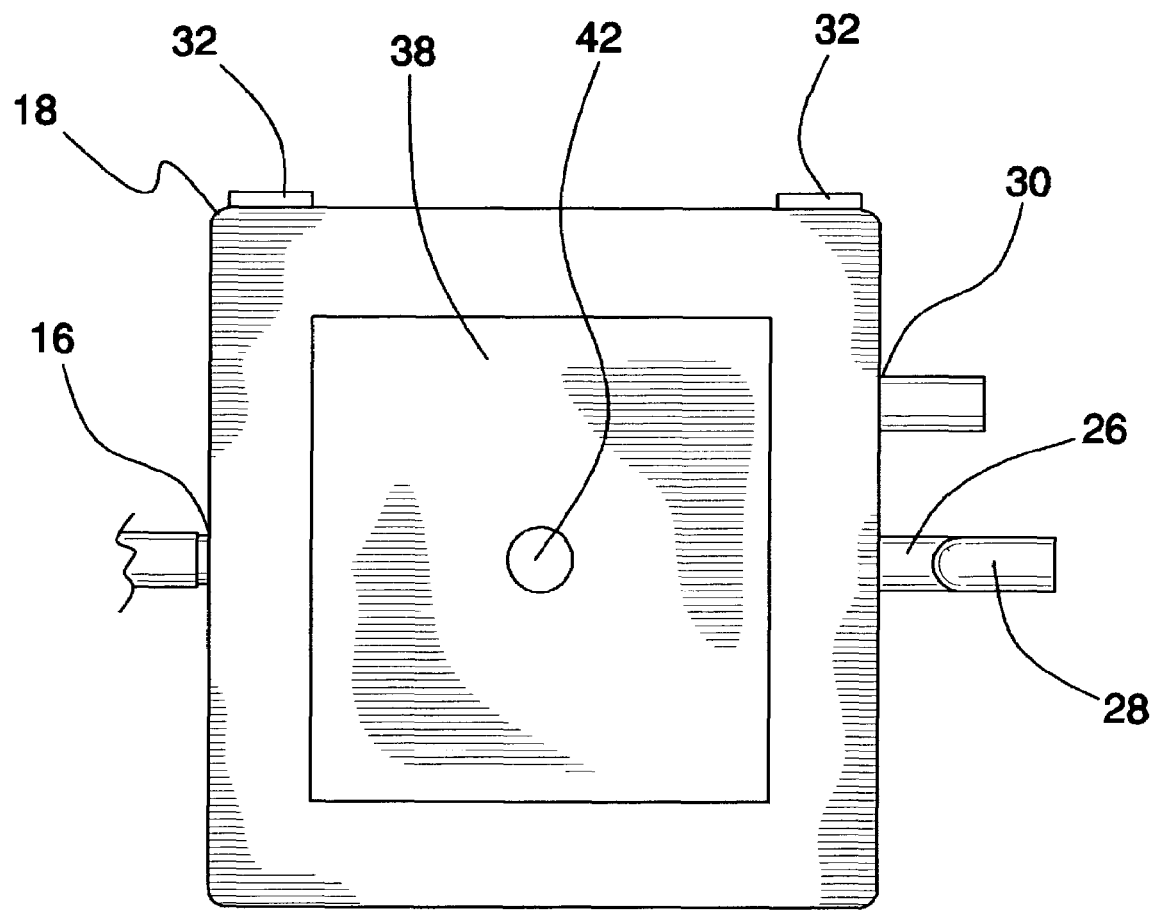
FIG. 3 is a top view of the grease trap of the present invention.

Referring now to the drawings, and particularly to FIGS. 1–3, a preferred embodiment of the grease trap of the present invention is shown and generally designated by the reference numeral 10.

In FIG. 1 the present invention is shown installed under a standard sink 12. Said sink 12 is connected to a sink pipe 14 through which wastewater flows. Said sink pipe 14 is connected to the intake port 16 of the present invention. The present invention comprises a container 18. The container 18 illustrated in the figure is rectangular at the upper portion 20. A cylindrical shape would also be suitable for said container 18. Said intake port 16 is located at a midpoint of said upper portion 20. The circumference of said container 18 reduces at the lower portion 22 of the container and forms a funnel shape. The base of said container 18 is attached to an outtake port 24. A pipe 26 is attached to said outtake port 24 and extends to a horizontal portion 28 that acts as an outlet to the remaining plumbing system. The top level of said horizontal portion 28 of said pipe 26 is higher then the top of said intake port 16. This is a significant novel feature of the present invention since it produces a water level inside said container 18 that is higher then the top of said intake port 16. The significance of this orientation will be further illuminated in the description of FIG. 2. Said upper portion 20 of said container 18 has a third vent port 30. Said vent port 30 is open and allows for the flow of air into and out of said container 18. Said vent port 30 eliminates the production and accumulation of noxious fumes inside the upper portion 20 of said container 18 that would be trapped therein otherwise. In the standard design of cabinets below sinks the rear portion of said container 18 of the present invention would be proximate to the back wall. The present invention is therefore designed to include a mounting mechanism that would attach said container 18 to said back wall. Said mounting mechanism may take many forms. The mechanism illustrated in FIG. 1 consists of a pair of flanges 32 attached to the top edge of said container 18. Said flanges 32 are arranged so that they will be flush with said back wall. A hole is defined through said flanges 32 and permits for the insertion of a bolt or screw that may be secured to the back wall. Many different materials would be suitable for the construction of the present invention. Polyvinyl chloride would be a suitable choice for all elements. Such a material would be resistant to corrosion. It could also be easily molded into the desired shapes. Lightweight metals such as copper or aluminum might be suitable for construction as well. Since it would be desirable to view the interior of said container 18 to identify the amount of grease build up that exists a viewing portal could be added to this design. Said portal could comprise a clear plastic or glass portion of said container 18 where the interior could be viewed to view the level of grease build up inside of the container.

FIG. 2 depicts the interior portion of the present invention while in use. Said sink pipe 14 is attached to said intake port 16. Said intake port 16 of said container 18 is located at a midpoint of the upper portion 20 of said container. The circumference of said container 18 gradually decreases to form a funnel that feeds to said outtake port 24. Said outtake port 24 is connected to a pipe 26. Said pipe 26 extends to a horizontal portion 28 that acts as an outlet of water into the remainder of the plumbing system. The top level of said horizontal portion 28 is higher then the top of said intake port 16. The significance of the orientation is the resulting water level 34 produced inside of said container 18. Said water level 34 is above the top of said intake port 16. This is significant because the water entering said container 18 would pass smoothly into the water layer. Because grease has a lower specific gravity then water it will float on the top of the water layer above said intake port 16. It will therefore not be disturbed by the flow of water into the container 18 from the intake. The result is that the grease will accumulate at the top of the container 18 and will not be mixed into the lower water layer. The water will be dispensed through said outtake port 24 at the bottom of said container 18 and will be forced through said pipe 26 to said horizontal portion 28 and into the remaining pipe system. When water stops flowing into said container 18 said water will empty only to a point where said water level 34 remains above said intake port 16. Thus said grease will remain in said container 18 above said intake port 16 and even with said horizontal portion 28 of said pipe 26. It will be desirable to periodically remove said grease from said container 18 as it begins to buildup. The top of said container 18 is formed to define an opening 36. Through said opening 36 said grease may be scooped off of the top of said water level 34 and discarded. A cover 38 may rest on said top of said container 18 and overlap said opening 36 defined by said top of said container. When said cover 38 rests thusly, said opening 36 is fully enclosed. In the illustrated embodiment said top comprises an indentation 40 around said opening 36. The outline of said indentation 40 matches the outline of said cover 38 so that said cover may rest inside said indentation. This arrangement prevents said cover 38 from sliding from side to side. Other embodiments of this feature can be envisioned such as a hinge attachment for said cover 38. Attached to said upper portion 20 of said container 18 is a vent port 30. Said vent port 30 is located at an ample distance above said horizontal portion 28 of said pipe 26 so that said water level 34 will not reach the level of said vent port 30 and spill out of said container 18. Said vent port 30 allows for air circulation and the escape of gases to prevent the creation of foul odors that would be created in a stagnant chamber. Also depicted in FIG. 2 are said flanges. Said flanges 32 are formed to define holes through which bolts may be inserted to mount said container 18.

FIG. 3 depicts the arrangement of the top of said container 18. In this figure said container 18 is square in shape, but alternative shapes such as cylindrical or rectangular would be just as effective. On the left of said container 18 is shown said intake port 16. Said intake port 16 is connected to said sink pipe 14, which carries wastewater from said sink 12 to the present invention. On the right side of said container 18 is shown said vent port 30. Said vent port 30 facilitates circulation of air inside said container 18 and the release of fumes. Also shown on the right side of said container 18 is said horizontal portion 28 of said pipe 26. Said horizontal portion 28 is connected to the remainder of the plumbing system and acts as the outlet for water from the grease trap. Illustrated at the rear of said container 18 is a pair of flanges 32 designed for mounting the present invention to a wall. Other designs can be envisioned such as hooks or a bottom stand upon which said container 18 could rest. The top of said container 18 is formed to define an opening 36. The opening 36 in this depiction is square. A square cover 38 is included in the present invention and has a shaped that overlaps completely said opening 36 defined by said top. A handle 42 is attached to the upper surface of said cover 38. Said handle 42 may be grasped and lifted to remove said cover 38 from said opening 36. A scoop may then be inserted through said opening 36 to remove grease build up at the top of said container 18.

While a preferred embodiment of the grease trap 10 has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specification are intended to be encompassed by the present invention. For example, any suitable easily molded material may be used instead of the polyvinyl chloride that has been described. And although the use for sinks has been described, there are slight variations, such as shape and size that would make the invention appropriate for other sources of wastewater.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A grease trap comprising:
    a hollow container having an interior wherein the wall of said container is formed to define a first hole and wherein the bottom of said container is formed to define a second hole;
    a first pipe engaged with said first hole defined by said wall of said container;
    a second pipe engaged with said second hole of said container and extending to a horizontal portion wherein the top level of said horizontal portion is higher then the top level of said first pipe; and
    a third pipe engaged with a third hole, wherein said wall of said container is formed to define a third hole above said first hole and said horizontal portion of said second pipe and below the top of said container, wherein said third pipe and said third hole are constructed and arranged in such a manner so as to be continuously open and unobstructed by the contents of said container, thereby providing continuous ventilation to said interior of said container.

2. The grease trap of claim 1 wherein the circumference of said container begins to become gradually smaller at a point below said first hole in said wall descending there from until the circumference of said container matches the circumference of said second hole.

3. The grease trap of claim 1 wherein the top of said container is formed to define an opening.

4. The grease trap of claim 3 further comprising a removable cover overlapping said opening defined by said top of said container.

5. The grease trap of claim 1 further comprising a pair of flanges attached to the top edge of said container wherein said flanges are formed to define a hole passing there through.

6. A grease trap comprising:
a hollow container having an interior wherein the wall of said container is formed to define a first hole, wherein the bottom of said container is formed to define a second hole, and wherein the top of said container is formed to define an opening;
a first pipe engaged with said first hole defined by said wall of said container;
a second pipe engaged with said second hole of said container and extending to a horizontal portion wherein the top level of said horizontal portion is higher then the top level of said first pipe;
a third pipe engaged with a third hole, wherein said wall of said container is formed to define a third hole above said first hole and said horizontal portion of said second pipe and below the top of said container, wherein said third pipe and said third hole are constructed and arranged in such a manner so as to be continuously open and unobstructed by the contents of said container, thereby permitting gasses to continuously escape from said interior of said container; and
a removable cover overlapping said opening defined by said top of said container.

7. The grease trap of claim 6 wherein the circumference of said container begins to become gradually smaller at a point below said first hole in said wall descending there from until the circumference of said container matches the circumference of said second hole.

8. The grease trap of claim 6 further comprising a pair of flanges attached to the top edge of said container wherein said flanges are formed to define a hole passing there through.

9. A grease trap comprising:
a hollow container having an interior wherein the wall of said container is formed to define a first hole, wherein the bottom of said container is formed to define a second hole, wherein said wall of said container is formed to define a third hole above said first hole and below the top of said container, and wherein the circumference of said container begins to become gradually smaller at a point below said first hole in said wall descending therefrom until the circumference of said container matches the circumference of said second hole;
a first pipe engaged with said first hole defined by said wall of said container;
a second pipe engaged with said second hole of said container and extending to a horizontal portion wherein the top level of said horizontal portion is higher then the top level of said first pipe and said horizontal portion is below said third hole;
a third pipe engaged with said third hole, wherein said third pipe and said third hole are constructed and arranged in such a manner so as to be continuously open and unobstructed by the contents of said container, thereby providing continuous ventilation to said interior of said container.

10. The grease trap of claim 9 wherein the top of said container is formed to define an opening.

11. The grease trap of claim 10 further comprising a removable cover overlapping said opening defined by said top of said container.

12. The grease trap of claim 9 further comprising a pair of flanges attached to the top edge of said container wherein said flanges are formed to define a hole passing there through.

* * * * *